UNITED STATES PATENT OFFICE.

ALFRED PHILIPS, OF HÖCHST, GERMANY, ASSIGNOR TO THE FARBWERKE, VORMALS MEISTER, LUCIUS & BRÜNING, OF SAME PLACE.

BASIC DISAZO DYE.

SPECIFICATION forming part of Letters Patent No. 610,367, dated September 6, 1898.

Application filed December 1, 1897. Serial No. 660,399. (Specimens.) Patented in Germany October 27, 1896, No. 97,244; in England December 7, 1896, No. 27,896, and in France December 7, 1896, No. 261,968.

*To all whom it may concern:*

Be it known that I, ALFRED PHILIPS, doctor of philosophy, a citizen of the Kingdom of Holland, residing at Höchst-on-the-Main, Germany, have invented certain new and useful Improvements in the Manufacture of Basic Disazo Dyestuffs, (which has been patented in England, No. 27,896, dated December 7, 1896; in France, No. 261,968, dated December 7, 1896, and in Germany, No. 97,244, dated October 27, 1896,) of which the following is a specification.

This invention relates to the production of basic disazo dyestuffs.

I have found that valuable basic dyestuffs may be obtained by diazotizing amidoazo dyestuffs and allowing them to act upon phenol-ammonium bases. The new dyestuffs have the property of dyeing wool and cotton evenly together in an acid-bath. According to their origin the new dyestuffs have the general formula,

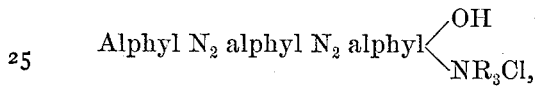

in which alphyl means an aromatic radical and R an alkyl.

I illustrate the dyestuff obtained, for example, from amidoazo-benzene and 2.7 naphtholtrimethyl ammonium. 23.3 kilos hydrochlorid of amidoazo-benzene are diazotized with eighteen kilos hydrochloric acid (20° Baumé) and seven kilos of sodium nitrite, and after adding twenty-two kilos of crystallized sodium acetate the whole is run into a solution containing twenty-four kilos of beta$_1$ naphthol beta$_4$ trimethyl ammonium chlorid.

The dyestuff separates out in form of red flakes, and the precipitation is completed by an addition of common salt. After filtration the dyestuff is dissolved in hot water and then salted out. It dyes wool and cotton a cherry red in an acid-bath.

The dyestuff is a brown-red brilliant substance, soluble in water and alcohol with a red color, soluble with difficulty in benzene, insoluble in ether or petroleum ether, and soluble in concentrated sulfuric acid with a bluish-red color.

Having now described my invention, what I claim is—

1. A process for the manufacture of basic disazo dyestuffs of the general formula,

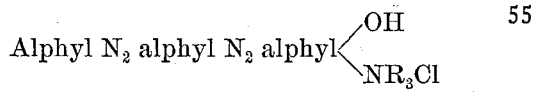

consisting in diazotizing amidoazo compounds and allowing them to act upon phenol-ammonium bases, substantially as set forth.

2. As a new product the dyestuff obtained by diazotizing amidoazo-benzene and treating it with 2.7 naphtholtrimethyl-ammonium, being a red powder, soluble in water and alcohol with a red color, soluble with difficulty in benzene, insoluble in ether and petroleum ether and dyeing wool and cotton cherry red in an acid-bath.

In testimony that I claim the foregoing as my invention I have signed my name in presence of two subscribing witnesses.

ALFRED PHILIPS.

Witnesses:
HEINRICH HAHN,
ALFRED BRISBOIS.